US011086123B2

United States Patent
Owen

(10) Patent No.: US 11,086,123 B2
(45) Date of Patent: Aug. 10, 2021

(54) RAMAN IMMERSION PROBE OPTICS

(71) Applicant: Harry Owen, Franklin, MI (US)

(72) Inventor: Harry Owen, Franklin, MI (US)

( * ) Notice: Subject to any disclaimer, the term of this patent is extended or adjusted under 35 U.S.C. 154(b) by 0 days.

(21) Appl. No.: 16/781,318

(22) Filed: Feb. 4, 2020

(65) Prior Publication Data
US 2020/0257110 A1    Aug. 13, 2020

Related U.S. Application Data

(60) Provisional application No. 62/802,514, filed on Feb. 7, 2019.

(51) Int. Cl.
*G02B 27/00* (2006.01)
*G01J 3/44* (2006.01)
*G01J 3/02* (2006.01)

(52) U.S. Cl.
CPC ........ *G02B 27/0037* (2013.01); *G01J 3/0208* (2013.01); *G01J 3/44* (2013.01)

(58) Field of Classification Search
CPC .................................................. G02B 27/0037
USPC .......................................................... 356/301
See application file for complete search history.

(56) References Cited

U.S. PATENT DOCUMENTS

| | | | | |
|---|---|---|---|---|
| 10,459,191 B1* | 10/2019 | Marple | ..................... | G02B 7/10 |
| 2005/0140973 A1* | 6/2005 | Owen | ....................... | G01J 3/44 |
| | | | | 356/301 |
| 2012/0075627 A1* | 3/2012 | Ashok | ..................... | G01N 21/05 |
| | | | | 356/301 |
| 2014/0200434 A1* | 7/2014 | Cheng | ................. | A61B 5/0095 |
| | | | | 600/407 |
| 2015/0377701 A1* | 12/2015 | Pawluczyk | ........... | G01J 3/0243 |
| | | | | 356/301 |
| 2015/0381909 A1* | 12/2015 | Butte | ....................... | H04N 9/04 |
| | | | | 348/68 |

* cited by examiner

*Primary Examiner* — Tarifur R Chowdhury
*Assistant Examiner* — Omar H Nixon
(74) *Attorney, Agent, or Firm* — The Law Offices of John G. Posa

(57) ABSTRACT

Achromatically corrected Raman immersion probes minimize chromatic and/or spherical aberration through the use of an achromat, apochromat, refractive/diffractive optics as opposed to a single lens geometry. The improved end optics are adapted for use with a probe body carrying a laser excitation and/or collection beam associated with Raman analysis. The achromatically corrected optic to focus the beam onto or within a sample. The sample may be a gas, a liquid, or a partial liquid such as a slurry. The achromatically corrected optic may be an achromat comprising a lens doublet or an achromat comprising a lens triplet or more optical elements. In one preferred embodiment, the achromatically corrected optic may be an apochromatic optic. A disclosed system includes the achromatically corrected end optic and Raman probehead operative to send and receive counter-propagating laser excitation and collection beams.

14 Claims, 2 Drawing Sheets

RAMAN IMMERSION PROBE OPTICS

REFERENCE TO RELATED APPLICATIONS

This application claims priority to, and the benefit of, U.S. Provisional Patent Application Ser. No. 62/802,514, filed Feb. 7, 2019, the entire content of which is incorporated herein by reference.

FIELD OF THE INVENTION

This invention relates generally to Raman spectroscopy and, more particularly, to improved Raman immersion probe optics.

BACKGROUND OF THE INVENTION

Most existing, commercially available Raman probes are based on a single lens focused design that requires selecting the correct focal length for the type of sample undergoing evaluation. Clear liquids allow for long focal lengths while slurries, liquids with a significant volume fraction of solids require a short focal length. In all of these examples, significant chromatic aberrations are created within the sample, and this large aberration zone, or significant chromatic focal shift, will result in the Raman spectra experiencing unwanted spectral modifications due to the presence of this effect during the acquisition period.

These chromatic aberrations effectively generate a different optimum pathlength for each Raman wavelength, whereby light close to the laser wavelength is collected more efficiently than Raman wavelengths further away from the laser wavelength. In all cases, it is advantageous to have the same focal point for the laser and the complete range of wavelengths in the Raman spectra effectively keeping the optimum pathlength the same for the laser and the scattered Raman wavelengths. To date, only achromatically corrected microscope objectives have been used to improve the imaging performance.

SUMMARY OF THE INVENTION

This invention improves upon Raman immersion probes through the use of optic designs that are achromatically corrected to limit the effects of chromatic and spherical aberration. The preferred embodiments use achromatic or apochromatic refractive/diffractive optics as opposed to a single lens-based geometry within the body of the Raman immersion probe.

The improved Raman immersion probe end optics according to the invention are adapted for use with a probe body carrying a laser excitation and/or collection beam associated with Raman analysis. The probe body includes a distal end with an achromatically corrected optic to focus the beam onto or within a sample. The sample may be a gas, a liquid, or a partial liquid such as a slurry.

The achromatically corrected optic may be an achromat comprising a lens doublet or an achromat comprising a lens triplet or more optical elements. In one preferred embodiment, the achromatically corrected optic may be an apochromatic optic. The achromatically corrected optic may also incorporate an aspheric lens or surface, and the achromatically corrected optic may be used as both as a focusing lens and as a sealed window. Alternatively, a separate sealed window may be provided.

Improved Raman immersion probe end optics may include a probe body with a proximal end coupled to a Raman probe operative to generate a collimated laser excitation beam and receive a counter-propagating collimated collection beam from the sample. In such an embodiment, the achromatically corrected optic at the distal end of the probe body focuses the laser excitation beam onto or within the sample and collimates the collection beam from the sample.

A system-level aspect of the invention may include the improved immersion probe and a Raman probehead operative to generate a collimated laser excitation beam and receive a counter-propagating collimated collection beam. The proximal end of a hollow tube is in optical communication with the probehead, and the distal end of the tube terminates in an achromatically corrected optic operative to focus the laser excitation beam onto or within a sample and collimate the collection beam from the sample for analysis by a Raman spectrometer.

DETAILED DESCRIPTION OF THE INVENTION

In accordance with this invention, immersion Raman probes use optic designs that are achromatically corrected to limit the effects of chromatic and spherical aberration. The preferred embodiments use an achromat, apochromat, optionally with refractive/diffractive optics as opposed to a single lens-based geometry within the body of the Raman immersion probe.

Figure 5:
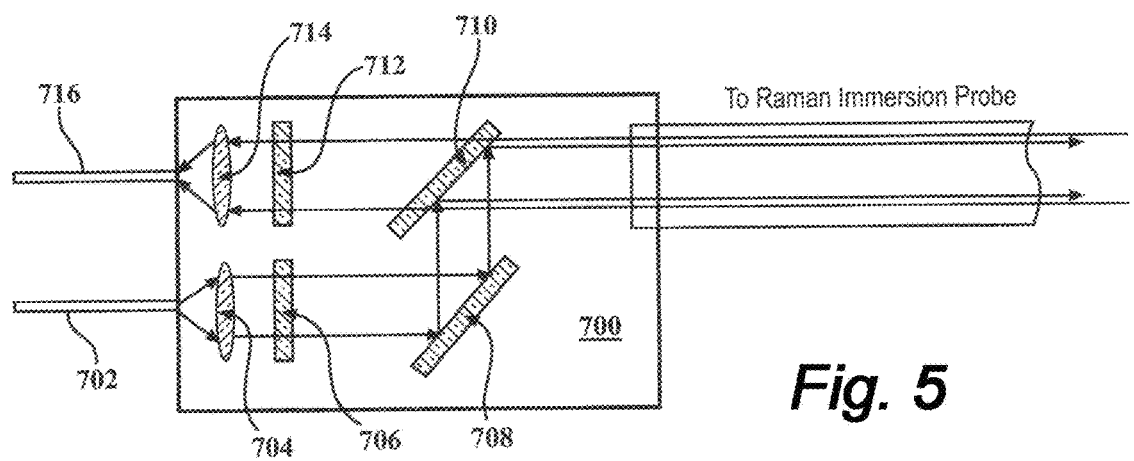
FIG. 5 illustrates a Raman probehead applicable to the various embodiments described herein.

The probe designs disclosed herein may comprise a hollow tube carrying a collimated beam to and from a sample through the distal optic arrangement. While this beam may be limited to a laser excitation beam or collection beam of the type used in Raman analysis, it is further typical for the collimated beam to be a counter-propagating beam carrying both excitation and collection beams in opposing directions to and from beam-splitting and filtering components further up in the probe construction, as illustrated in FIG. 5.

Figure 1:
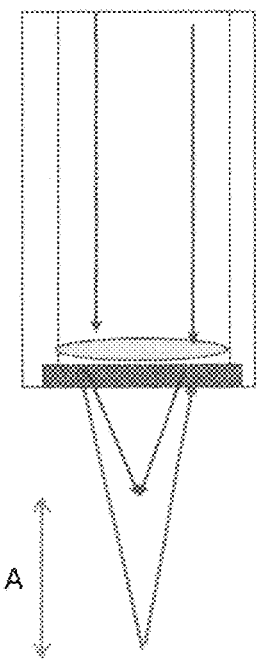
FIG. 1 is a schematic diagram indicating the relative size of an aberration zone "A" associated with an Raman immersion probe optic based upon a single-lens design.
Figure 2:
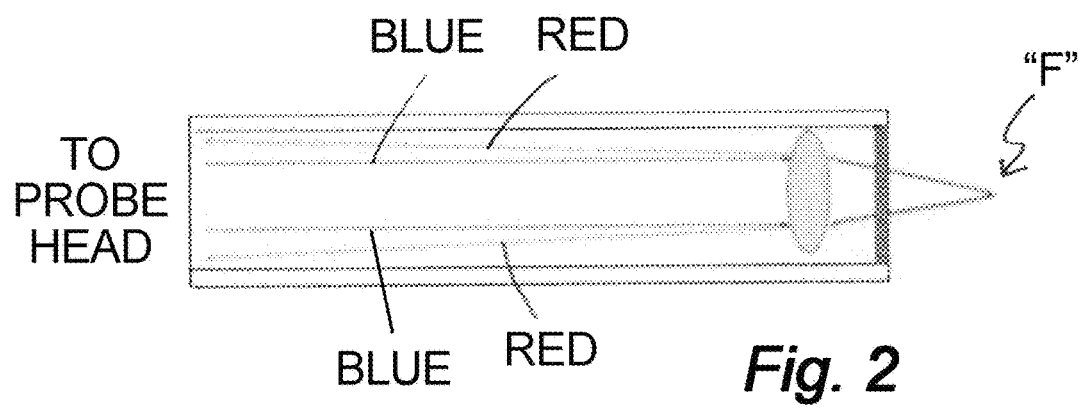
FIG. 2 shows the way in which Raman scattered light at longer wavelengths, created at the focus of the laser wavelength, will be collected and diverge by different amounts as they return through the single lens operating as the collection lens.

FIG. 1 is a schematic diagram showing the relative size of the aberration zone "A" associated with a single-lens design. Further, as depicted in FIG. 2, Raman scattered light at longer wavelengths (i.e., RED), created at the focus "F" of the laser excitation (BLUE), will be collected and diverge by different amounts as it returns through the single lens operating as the collection lens. Vignetting is possible, depending upon the length of the returning path length and the degree of divergence as the collected light returns to the lens responsible for imaging the Raman signal onto a collection fiber, for example.

Figure 3A:
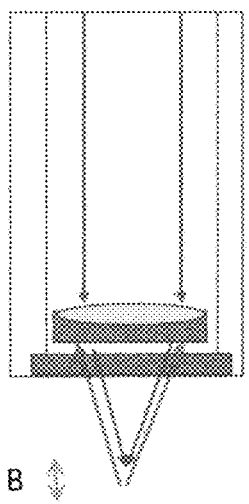
FIG. 3A shows the relative size of an aberration zone "B" associated with an Raman immersion probe incorporating an achromatically corrected achromat end optic.
Figure 3B:
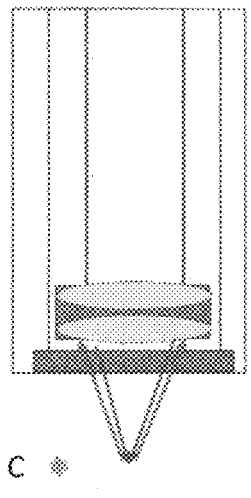
FIG. 3B illustrates the relative size of an aberration zone "C" associated with an Raman immersion probe incorporating an achromatically corrected apochromat end optic.

FIGS. 3A, B, show how the use of achromatic lenses in accordance with the invention correct for wavelength dispersion and vignetting, bringing the excitation and collection beams into better focus on the same plane. FIG. 3A illustrates the use of an achromat optic, exhibiting a reduced, relative aberration zone "B", and FIG. 3B depicts the use of an apochromat optic, exhibiting an even smaller aberration zone "C". As shown in these drawings, achromatic lenses are corrected to bring two wavelengths (typically red and blue) into focus on the same plane. Apochromatic lenses are corrected to bring three wavelengths (typically red, green and blue) into focus on the same plane.

Figure 4:
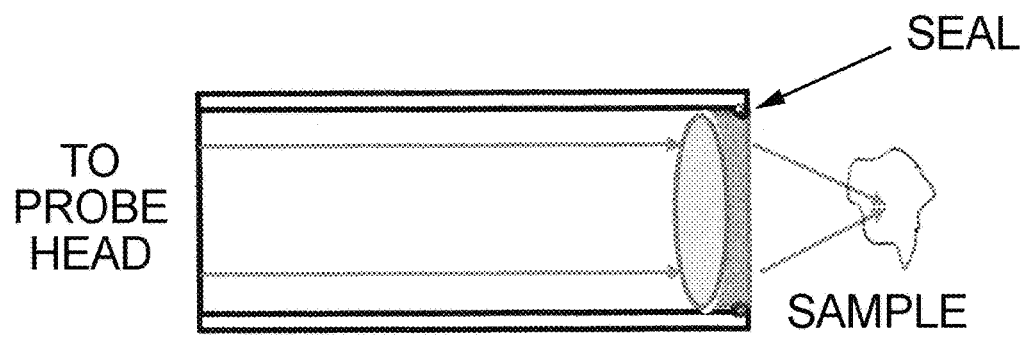
FIG. 4 is a schematic of an achromatically corrected optic being used as both the lens and sealed window in the immersion probe.

FIG. 4 shows how an achromatically corrected optic may also serve the dual purpose of providing a sealed window at the distal end of a Raman probe. While a achromat is shown, the configuration may also use other achromatically corrected optics disclosed herein, including apochromat optics.

Fiber optic-based, Raman immersion probes for life sciences and directly inserted Raman immersion probes for chemical and polymer industries can all benefit from this invention. For processes such as crystallization and fermentation, were the number of particles increases during the measurement period and therefore the amount of scattering increases during the measurement period, the aberration zone or sampling volume also needs to be minimized to allow for the collection of consistent high-quality Raman spectra.

The minimized aberration zone made possible by the invention will improve sensitivity, generate more precise and accurate measurements, and provide improved calibration transfer between different probes and instruments so that new calibration models do not need to be updated or replaced. Calibration models are required to transform Raman spectra into concentration values of the different chemical components.

By replacing the single lens with an achromatically corrected optic within the body of a Raman immersion probe, the aberration zone or chromatic focal shift is minimized generating a Raman spectrum without unwanted spectral variance that will provide improved sensitivity, more precise and accurate measurements, and improved calibration transfer between different probes and instruments so that new calibration models do not need to be updated or replaced.

FIG. 4 illustrates a Raman probehead applicable to the various embodiments described herein, with the understanding that other probeheads may be used so long as they generate a counter-propagating excitation/collection beam. Prior art examples of patented Raman probeheads may be found in U.S. Pat. No. 5,112,127 to Carrabba et al. and U.S. Pat. No. 5,377,004 December 1994 Owen et al., the teachings of which are incorporated herein buy reference.

An external laser (not shown) may connect to the probehead 700 through a length of fiber optic 702. Inside the probehead, an optical lens 704 is used to collimate the diverging laser output beam exiting from the end of fiber optic 702. A laser bandpass filter 706, positioned after the collimating lens 704, rejects unwanted fluorescence and Raman scattering generated in the fiber by the laser. The reconditioned laser output is directed onto a fold mirror 708 that directs the laser onto a beam combiner 710 that directs the laser beam into the Raman immersion probe and the path of the returning Raman signal.

The collimated laser energy and retuning Raman signal would ordinarily be focused into a sample by an optical lens located just inside of a sealed window. In contrast to this existing design, however, in the embodiments of the invention disclosed herein, focusing optics would be eliminated. Instead, the returning collimated Raman signal from the sample is transmitted by the beam combiner 710 and directed onto a narrow laser rejection filter 712 to remove unwanted scattered laser light, after which the Raman signal is then focused by an optical lens 714 onto outgoing fiber optic 716 that will then transport the Raman signal back to a spectrometer for analysis.

Important advantages of the invention include at least the following:
1. By using an achromatically corrected optic within the body of a Raman immersion probe the aberration zone is minimized generating improved sensitivity and more precise and accurate measurements of the chemical components within the sample material.
2. By using an achromatically corrected optic within the body of a Raman immersion probe the aberration zone is minimized generating improved calibration transfer between different probes and instruments so that new calibration models do not need to be modified or replaced.
3. By using an aspheric optical component within the achromatically corrected optic additional design flexibility for controlling spherical and other aberrations while providing higher throughput.
4. By using a diffractive optical component within the achromatically corrected optic additional design flexibility for controlling chromatic aberrations can be used to produce smaller more compact optics.

The invention claimed is:

1. Improved Raman immersion probe end optics, comprising:
   a hollow probe body having a proximal end coupled to a Raman probe operative to provide a collimated laser excitation beam and receive a counter-propagating collimated collection beam from the sample;
   wherein the collimated laser excitation beam and counter-propagating collimated collection beam from the sample occupy the same space within the hollow probe body;
   an optic mounted at the distal end of the probe body operative to simultaneously focus the laser excitation beam onto or within a sample and collimate the collection beam from the sample; and
   wherein the optic is an achromatically corrected optic.

2. The improved Raman immersion probe end optics of claim 1, wherein the achromatically corrected optic is an achromat comprising a lens doublet.

3. The improved Raman immersion probe end optics of claim 1, wherein the achromatically corrected optic is an achromat comprising a lens triplet.

4. The improved Raman immersion probe end optics of claim 1, wherein the achromatically corrected optic is an apochromatic optic.

5. The improved Raman immersion probe end optics of claim 1, wherein the achromatically corrected optic is an achromat or apochromat lens incorporating a diffractive element.

6. The improved Raman immersion probe end optics of claim 1, wherein the achromatically corrected optic is an achromat or apochromat incorporating an aspheric lens.

7. The improved Raman immersion probe end optics of claim 1, wherein the achromatically corrected optic is used as both as a focusing lens and as a sealed window.

8. An immersion probe adapted for use with a Raman probehead operative to generate a collimated laser excitation beam and receive a counter-propagating collimated collection beam, the probe comprising:
- a hollow tube having proximal and distal ends, and wherein the proximal end of the tube is in optical communication with the probehead, and the distal end of the tube terminates in an achromatically corrected optic operative to focus the laser excitation beam onto or within a sample and collimate the collection beam from the sample.

9. The immersion probe of claim 8, wherein the achromatically corrected optic is an achromat comprising a lens doublet.

10. The immersion probe of claim 8, wherein the achromatically corrected optic is an achromat comprising a lens triplet.

11. The immersion probe of claim 8, wherein the achromatically corrected optic is an apochromatic optic.

12. The immersion probe of claim 8, wherein the achromatically corrected optic is an achromat or apochromat lens incorporating a diffractive element.

13. The immersion probe of claim 8, wherein the achromatically corrected optic is an achromat or apochromat incorporating an aspheric lens.

14. The immersion probe of claim 8, wherein the achromatically corrected optic is used as both a focusing lens and as a sealed window.

\* \* \* \* \*